United States Patent
Kumagai et al.

(10) Patent No.: US 12,536,827 B2
(45) Date of Patent: Jan. 27, 2026

(54) GESTURE DETECTION APPARATUS AND GESTURE DETECTION METHOD

(71) Applicant: Mitsubishi Electric Corporation, Tokyo (JP)

(72) Inventors: Taro Kumagai, Tokyo (JP); Takuya Murakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 512 days.

(21) Appl. No.: 17/917,668

(22) PCT Filed: May 27, 2020

(86) PCT No.: PCT/JP2020/020839
§ 371 (c)(1),
(2) Date: Oct. 7, 2022

(87) PCT Pub. No.: WO2021/240671
PCT Pub. Date: Dec. 2, 2021

(65) Prior Publication Data
US 2023/0154226 A1    May 18, 2023

(51) Int. Cl.
*G06V 40/10* (2022.01)
*G06V 10/26* (2022.01)
(Continued)

(52) U.S. Cl.
CPC .......... *G06V 40/113* (2022.01); *G06V 10/273* (2022.01); *G06V 20/597* (2022.01); *G06V 40/171* (2022.01)

(58) Field of Classification Search
CPC .. G06V 40/113; G06V 40/171; G06V 20/597; G06V 10/273
See application file for complete search history.

(56) References Cited

U.S. PATENT DOCUMENTS 9,449,216 B1 *  9/2016  Dhua et al. ............. G06K 9/00
2014/0172231 A1  6/2014  Terada et al.
(Continued)

FOREIGN PATENT DOCUMENTS

JP      2006-350576 A      12/2006
JP         4448304 B2 *    4/2010  ............... G06T 1/00
(Continued)

OTHER PUBLICATIONS

International Search Report (PCT/ISA/210) issued in PCT/JP2020/020839, dated Aug. 25, 2020.
(Continued)

*Primary Examiner* — Vu Le
*Assistant Examiner* — Matthew James Bodnark
(74) *Attorney, Agent, or Firm* — Birch, Stewart, Kolasch & Birch, LLP

(57) ABSTRACT

Provided is a gesture detection apparatus that accurately detects a hand of an occupant in gesturing. The gesture detection apparatus includes a face frame information acquisition unit, a hand candidate detection unit, and a determination unit. The face frame information acquisition unit acquires face frame information. The face frame is set so as to surround the face of the occupant detected on the basis of the video. The hand candidate detection unit detects a hand candidate on the basis of the video. The determination unit rejects the information of the hand candidate so that the hand candidate is not detected as the hand of the occupant in the gesture of the occupant as a detection target on the basis of a predetermined condition regarding the overlap between the face frame in the video and the hand candidate frame set to surround the hand candidate.

10 Claims, 13 Drawing Sheets

(51) Int. Cl.
    *G06V 20/59*     (2022.01)
    *G06V 40/16*     (2022.01)

(56) References Cited

U.S. PATENT DOCUMENTS

2019/0065873 A1    2/2019  Wang et al.
2019/0213406 A1*  7/2019  Porikli et al. ............ G06K 9/00

FOREIGN PATENT DOCUMENTS

| JP | 2014048937 A | * | 3/2014 | ............... G06F 3/01 |
| JP | 2014-119295 A | | 6/2014 | |
| JP | 2014-197252 A | | 10/2014 | |
| JP | 2019536673 A | * | 12/2019 | ........... G06V 20/597 |

OTHER PUBLICATIONS

Written Opinion of the International Searching Authority (PCT/ISA/237) issued in PCT/JP2020/020839, dated Aug. 25, 2020.

* cited by examiner

F I G. 4
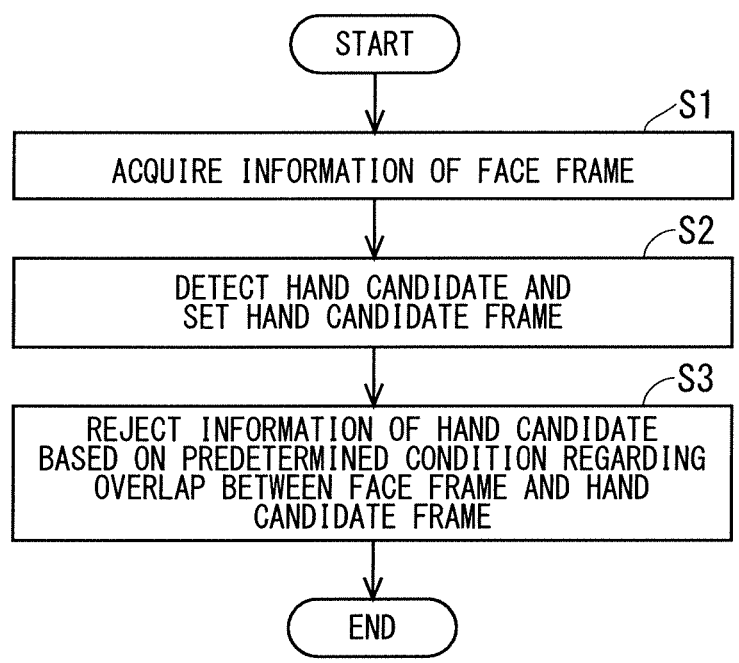

F I G. 9
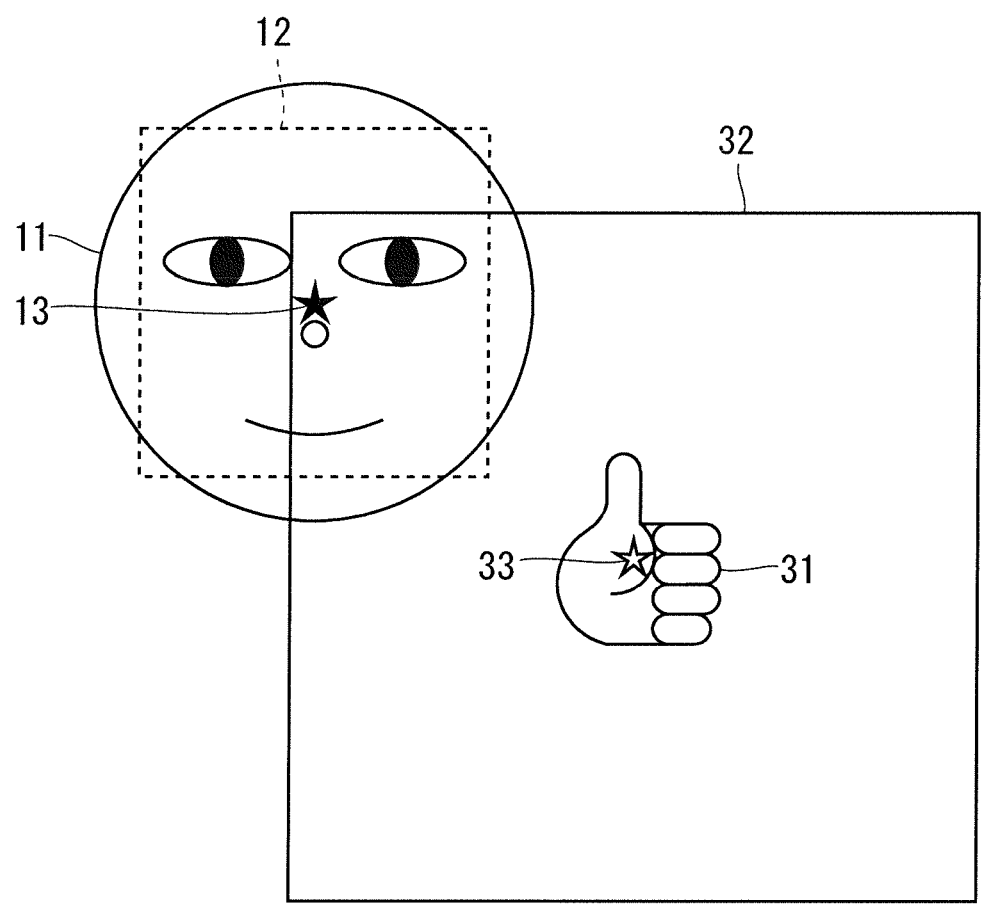

GESTURE DETECTION APPARATUS AND GESTURE DETECTION METHOD

TECHNICAL FIELD

The present disclosure relates to a gesture detection apparatus and a gesture detection method.

BACKGROUND ART

Regarding the operation of an in-vehicle device by an occupant of a vehicle, a system has been proposed which allows the occupant to operate the in-vehicle device without touching the in-vehicle device by detecting the gesture of a hand of the occupant. For example, a gesture detection apparatus detects the hand of the occupant on the basis of a video captured by a camera or the like provided in the vehicle. Since the in-vehicle device operates according to the gesture of the hand of the occupant, accuracy is required in detecting the hand of the occupant by the gesture detection apparatus. Patent Document 1 proposes a controller that detects information regarding a user's hand only from a gesture area set on the basis of the area of a driver's face.

PRIOR ART DOCUMENT

Patent Document

Patent Document 1: Japanese Patent Application Laid-Open No. 2014-119295

SUMMARY

Problem to be Solved by the Invention

The gesture detection apparatus detects the hand of the occupant on the basis of a video. Therefore, depending on the state of the video, the gesture detection apparatus may detect an object other than the hand as the hand.

The present disclosure is to solve the above problem and to provide a gesture detection apparatus that accurately detects a hand of an occupant in gesturing.

Means to Solve the Problem

A gesture detection apparatus according to the present disclosure includes a face frame information acquisition unit, a hand candidate detection unit, and a determination unit. The face frame information acquisition unit acquires face frame information. The face frame is set so as to surround the face of the occupant detected on the basis of the video captured by the imaging device provided in the vehicle. The hand candidate detection unit detects a hand candidate that is a candidate for the hand of the occupant on the basis of the video. The determination unit rejects the information of the hand candidate so that the hand candidate is not detected as the hand of the occupant in the gesture of the occupant as a detection target on the basis of a predetermined condition regarding the overlap between the face frame in the video and the hand candidate frame set to surround the hand candidate.

Effects of the Invention

The present disclosure provides a gesture detection apparatus that accurately detects a hand of an occupant in gesturing.

Objects, features, aspects, and advantages of the present disclosure will become more apparent from the following detailed description of the invention and the accompanying drawings.

BRIEF DESCRIPTION OF DRAWINGS

FIG. 4 is a flowchart illustrating a gesture detection method according to the first embodiment.

FIG. 9 is a view illustrating an example in which the hand candidate frame in FIG. 8 is enlarged.

DESCRIPTION OF EMBODIMENTS

First Embodiment

Figure 1:
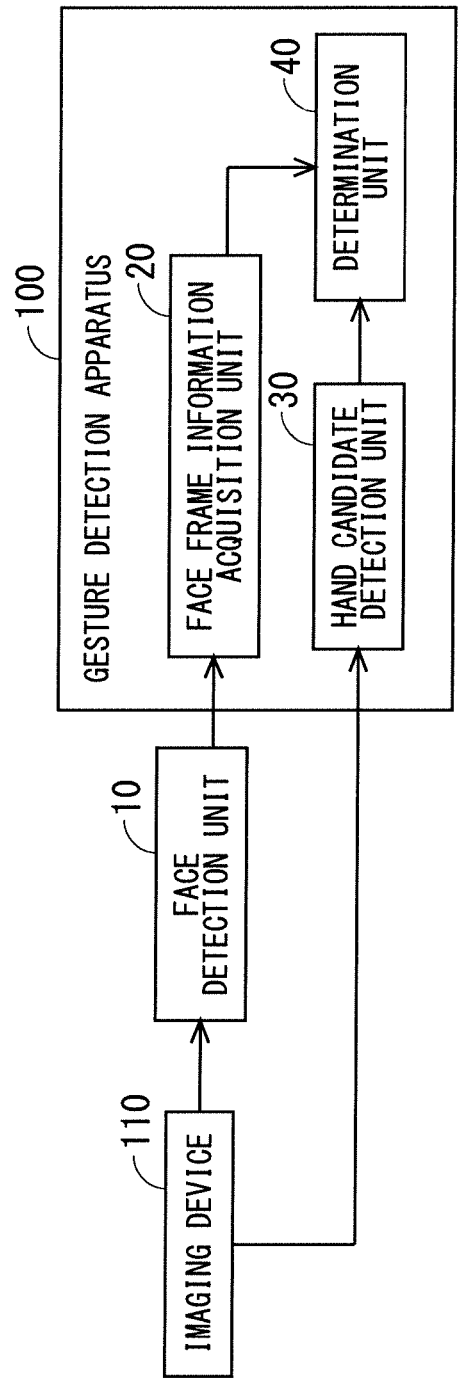
FIG. 1 is a functional block diagram illustrating the configuration of a gesture detection apparatus according to a first embodiment.

FIG. 1 is a functional block diagram illustrating the configuration of a gesture detection apparatus 100 according to a first embodiment. Furthermore, FIG. 1 illustrates an imaging device 110 and a face detection unit 10 as devices that operate in association with the gesture detection apparatus 100.

The imaging device 110 is provided in a vehicle. The imaging device 110 captures a video of an occupant in the interior of the vehicle.

The face detection unit 10 detects the face of the occupant on the basis of the video. The face detection unit 10 sets a face frame so as to surround the face. "To surround the face" includes surrounding the entire outline of the face or including a predetermined face part even if not surrounding the entire outline.

The gesture detection apparatus 100 detects the gesture of a hand of an occupant of the vehicle on the basis of a video captured by the imaging device 110.

The gesture detection apparatus 100 includes a face frame information acquisition unit 20, a hand candidate detection unit 30, and a determination unit 40.

The face frame information acquisition unit 20 acquires the information of the face frame of the occupant from the face detection unit 10.

The hand candidate detection unit 30 detects a hand candidate that is a candidate of a hand of the occupant on the basis of the video captured by the imaging device 110. The hand candidate detection unit 30 detects a hand candidate by, for example, matching a pattern of the shape of the object (luminance distribution information) in the video with a predetermined pattern of the shape of the hand. In addition, the hand candidate detection unit 30 sets a hand candidate frame so as to surround the hand candidate.

The determination unit 40 rejects the information of the hand candidate on the basis of a predetermined condition regarding the overlap between the face frame and the hand candidate frame in the video. The gesture detection apparatus 100 does not identify the rejected hand candidate as the hand constituting the gesture of the occupant.

Figure 2:
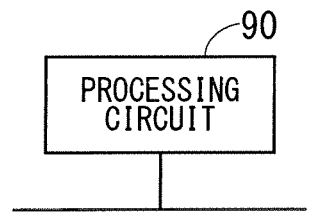
FIG. 2 is a diagram illustrating an example of the configuration of a processing circuit included in the gesture detection apparatus.

FIG. 2 is a diagram illustrating an example of the configuration of a processing circuit 90 included in the gesture detection apparatus 100. The functions of the face frame information acquisition unit 20, the hand candidate detection unit 30, and the determination unit 40 are implemented by the processing circuit 90. That is, the processing circuit 90 includes the face frame information acquisition unit 20, the hand candidate detection unit 30, and the determination unit 40.

In a case where the processing circuit 90 is dedicated hardware, the processing circuit 90 is, for example, a single circuit, a composite circuit, a programmed processor, a parallel programmed processor, an application specific integrated circuit (ASIC), a field-programmable gate array (FPGA), a circuit obtained by combining these, or the like. The functions of the face frame information acquisition unit 20, the hand candidate detection unit 30, and the determination unit 40 may be individually implemented by a plurality of processing circuits, or may be collectively implemented by one processing circuit.

Figure 3:
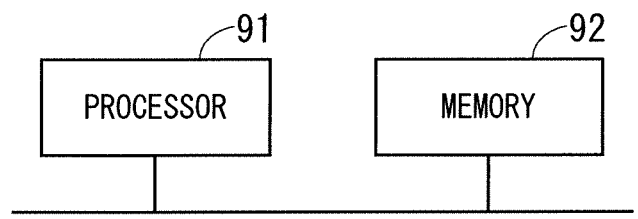
FIG. 3 is a diagram illustrating another example of the configuration of the processing circuit included in the gesture detection apparatus.

FIG. 3 is a diagram illustrating another example of the configuration of a processing circuit included in the gesture detection apparatus 100. The processing circuit includes a processor 91 and a memory 92. The processor 91 executes the program stored in the memory 92 to implement the functions of the face frame information acquisition unit 20, the hand candidate detection unit 30, and the determination unit 40. For example, software or firmware described as programs are executed by the processor 91 to implement each function. As described above, the gesture detection apparatus 100 includes the memory 92 that stores programs and the processor 91 that executes the programs.

The programs describe a function of the gesture detection apparatus 100 that acquires the information of a face frame set to surround the face of the occupant detected on the basis of the video captured by the imaging device 110 provided in the vehicle. In addition, the programs describe a function of the gesture detection apparatus 100 that detects a hand candidate that is a candidate of the hand of the occupant on the basis of the video. Furthermore, the programs describe a function of rejecting the information of a hand candidate so that the hand candidate is not detected as the hand of the occupant in the gesture of the occupant as a detection target on the basis of a predetermined condition regarding the overlap between the face frame in the video and the hand candidate frame set to surround the hand candidate. As described above, the programs cause a computer to execute the procedures or methods of the face frame information acquisition unit 20, the hand candidate detection unit 30, and the determination unit 40.

The processor 91 is, for example, a central processing unit (CPU), an arithmetic device, a microprocessor, a microcomputer, or a digital signal processor (DSP). The memory 92 is, for example, a nonvolatile or volatile semiconductor memory such as a random access memory (RAM), a read only memory (ROM), a flash memory, an erasable programmable read only memory (EPROM), or an electrically erasable programmable read only memory (EEPROM). Alternatively, the memory 92 may be any storage medium to be used in the future, such as a magnetic disk, a flexible disk, an optical disk, a compact disk, a mini disk, or a DVD.

Some of the functions of the face frame information acquisition unit 20, the hand candidate detection unit 30, and the determination unit 40 may be implemented by dedicated hardware, and the other functions may be implemented by software or firmware. In this manner, the processing circuit implements the above-described functions by hardware, software, firmware, or a combination thereof.

FIG. 4 is a flowchart illustrating a gesture detection method according to the first embodiment. Before step S1 illustrated in FIG. 4, the face detection unit 10 detects the face of the occupant on the basis of the video captured by the imaging device 110 provided in the vehicle and sets a face frame so as to surround the face.

In step S1, the face frame information acquisition unit 20 acquires the information of the face frame of the occupant from the face detection unit 10.

In step S2, the hand candidate detection unit 30 detects a hand candidate that is a candidate of a hand of the occupant on the basis of the video captured by the imaging device 110. In addition, the hand candidate detection unit 30 sets a hand candidate frame so as to surround the hand candidate.

In step S3, the determination unit 40 determines whether to reject the information of the hand candidate on the basis of a predetermined condition regarding the overlap between the face frame and the hand candidate frame in the video. The determination unit 40 rejects the information of the hand candidate in accordance with the determination result. The rejected hand candidate is not detected as the hand of the occupant in the gesture of the occupant as a detection target. In other words, the gesture detection apparatus 100 does not identify the rejected hand candidate as the hand constituting the gesture of the occupant.

In summary, the gesture detection apparatus 100 according to the first embodiment includes the face frame information acquisition unit 20, the hand candidate detection unit 30, and the determination unit 40. The face frame information acquisition unit 20 acquires face frame information. The face frame is set so as to surround the face of the occupant detected on the basis of the video captured by the imaging device 110 provided in the vehicle. The hand candidate detection unit 30 detects a hand candidate that is a candidate for the hand of the occupant on the basis of the video. The determination unit 40 rejects the information of the hand candidate so that the hand candidate is not detected as the hand of the occupant in the gesture of the occupant as a detection target on the basis of a predetermined condition regarding the overlap between the face frame in the video and the hand candidate frame set to surround the hand candidate.

The gesture detection apparatus 100 described above accurately detects a hand of the occupant in gesturing.

In addition, the gesture detection method according to the first embodiment acquires the information of a face frame set to surround the face of the occupant detected on the basis of the video captured by the imaging device 110 provided in the vehicle. In addition, the gesture detection method detects a hand candidate that is a candidate for the hand of the occupant on the basis of the video. In addition, the gesture detection method rejects the information of the hand candidate so that the hand candidate is not detected as the hand of the occupant in the gesture of the occupant as a detection target on the basis of a predetermined condition regarding the overlap between the face frame in the video and the hand candidate frame set to surround the hand candidate.

According to such a gesture detection method, the hand of the occupant in gesturing is accurately detected.

Second Embodiment

A gesture detection apparatus and a gesture detection method according to a second embodiment will be described. The second embodiment is a subordinate concept of the first embodiment, and the gesture detection apparatus according to the second embodiment includes each component of the gesture detection apparatus 100 in the first embodiment. Note that a description of configurations and operations similar to those of the first embodiment will be omitted.

Figure 5:
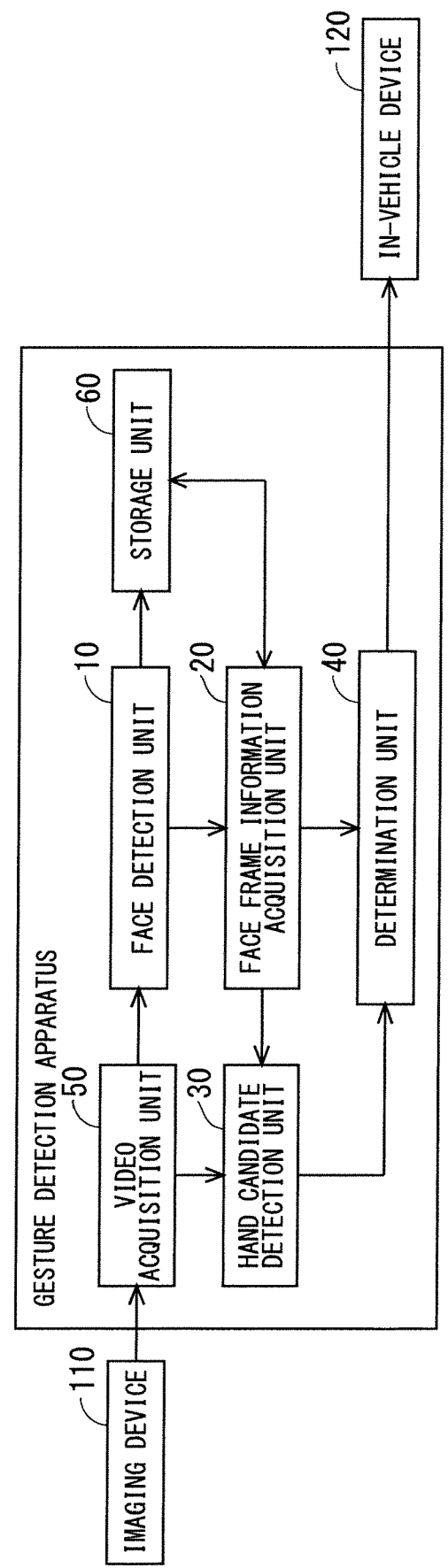
FIG. 5 is a functional block diagram illustrating the configuration of a gesture detection apparatus according to a second embodiment.

FIG. 5 is a functional block diagram illustrating the configuration of a gesture detection apparatus 101 according to the second embodiment. Furthermore, FIG. 5 illustrates the imaging device 110 and the in-vehicle device 120 that operate in association with the gesture detection apparatus 101.

The imaging device 110 is provided at the front center in the interior of the vehicle. The imaging device 110 photographs the interior of the vehicle at a wide angle and both the driver's seat and the passenger's seat at a time. The imaging device 110 is, for example, a camera that detects infrared rays or a camera that detects visible light. The gesture detection apparatus 101 according to the second embodiment detects the gesture of the hand of the occupant of the vehicle on the basis of a video captured by the imaging device 110. The gesture is a gesture for operating the in-vehicle device 120. The in-vehicle device 120 is, for example, an air conditioner or an audio. The temperature adjustment of the air conditioner, the volume adjustment of the audio, and the like are executed by the gesture detected by the gesture detection apparatus 101. However, the in-vehicle device 120 is not limited to the air conditioner and the audio set.

The gesture detection apparatus 101 includes a video acquisition unit 50, a face detection unit 10, a storage unit 60, a face frame information acquisition unit 20, a hand candidate detection unit 30, and the determination unit 40.

The video acquisition unit 50 acquires a video captured by imaging device 110 for each frame.

The face detection unit 10 detects the face of the occupant for each frame of the video. The face detection unit 10 sets a face frame for the face. That is, the face frame is set for each frame. The face frame does not need to be set to surround the entire contour of the face and may be set to surround, for example, a predetermined face part. In addition, the outer shape of the face frame may be rectangular or another shape. The face frame may be deemed to be a face area.

When the face detection unit 10 successfully detects the face, the storage unit 60 stores the information of the face frame for each frame.

The face frame information acquisition unit 20 acquires face frame information for each frame. When the face of the occupant in a frame as a processing target is detected, the face frame information acquisition unit 20 acquires the information of the face frame in the frame as the processing target. In a case where the face of the occupant in the frame as the processing target is not detected, the face frame information acquisition unit 20 operates as follows. In this case, a frame before the frame as the processing target is set as the first frame, and the frame as the processing target is set as the second frame. The face of the occupant in the first frame is detected. The face of the occupant in the second frame is not detected. In this case, in the processing of the second frame, the face frame information acquisition unit 20 acquires the information of the face frame in the first frame from the storage unit 60.

The second frame is a frame within a predetermined number of frames from the first frame. The predetermined number of frames may be stored in the gesture detection apparatus 101 or may be input from the outside, for example. It is preferable that the first frame is a frame in which the face of the occupant is detected immediately before the second frame.

The hand candidate detection unit 30 detects a hand candidate that is a candidate for the hand of the occupant for each frame of the video captured by the imaging device 110. The hand candidate detection unit 30 detects a hand candidate of the occupant by, for example, matching a pattern of the shape of an object (luminance distribution information) in the video with a predetermined pattern of the shape of the hand, that is, by pattern matching processing. The shape of the hand as the detection target may be either the shape of the open hand or the shape of the closed hand. The shape of the hand as the detection target may be, for example, the shape of the hand indicating a number, the shape of the hand indicating a direction, the shape of the hand indicating the intention of the occupant (such as OK or Good), or the like.

The hand candidate detection unit 30 sets a hand candidate frame so as to surround a hand candidate. That is, a hand candidate frame is set for each frame. The size of the hand candidate frame is set based on, for example, the size of the face frame. For example, the size of the hand candidate frame is set to the same size as the face frame with reference to the center position of the hand candidate frame. Alternatively, for example, the size of the hand candidate frame is set to a size to which the face frame is enlarged or reduced at an arbitrary magnification with reference to the center position of the hand candidate frame. The magnification can be appropriately changed according to the accuracy of the detection of the hand candidate. The hand candidate frame may be deemed to be a hand candidate area.

The determination unit 40 rejects the information of the hand candidate for each frame on the basis of a predetermined condition regarding the overlap between the face frame and the hand candidate frame. The predetermined condition may be stored in the gesture detection apparatus 101 or may be input from the outside, for example. An example of the predetermined condition will be described later. "Rejects" may include that the determination unit 40 identifies the hand candidate as an object other than the hand. Alternatively, "rejects" may include that the determination unit 40 invalidates the information of the hand candidate. In any case, the rejected hand candidate is not detected as the hand of the occupant in the gesture of the occupant as a detection target. In other words, the gesture detection apparatus 101 does not identify the rejected hand candidate as the hand constituting the gesture of the occupant. On the other hand, the gesture detection apparatus 101 identifies the hand candidate not rejected by the determination unit 40 as the hand constituting the gesture of the occupant. Operation processing and the like of the in-vehicle device 120 are executed on the basis of the gesture of the hand of the occupant identified by the gesture detection apparatus 101. Note that, in the functional block diagram illustrated in FIG. 5, the illustration of functional units that perform processing between the determination unit 40 and the in-vehicle device 120 is omitted.

In a case where at least a part of the face frame overlaps the hand candidate frame and the center of the face frame is included in the hand candidate frame, the determination unit 40 according to the second embodiment rejects the information of the hand candidate. That is, the predetermined condition in the second embodiment is that at least a part of the face frame overlaps the hand candidate frame, and the center of the face frame is included in the hand candidate frame.

In a case where the first frame and the second frame have the above relationship, the determination unit 40 rejects the information of the hand candidate in the second frame on the basis of the condition regarding the overlap between the face frame in the first frame and the hand candidate frame in the second frame. For example, when at least a part of the face frame of the first frame overlaps the hand candidate frame of the second frame and the center of the face frame of the first frame is included in the hand candidate frame of the second frame, the determination unit 40 rejects the information of the hand candidate of the second frame.

The functions of the face detection unit 10, the face frame information acquisition unit 20, the hand candidate detection unit 30, the determination unit 40, the video acquisition unit 50, and the storage unit 60 are implemented by the processing circuit illustrated in FIG. 2 or 3.

Figure 6:
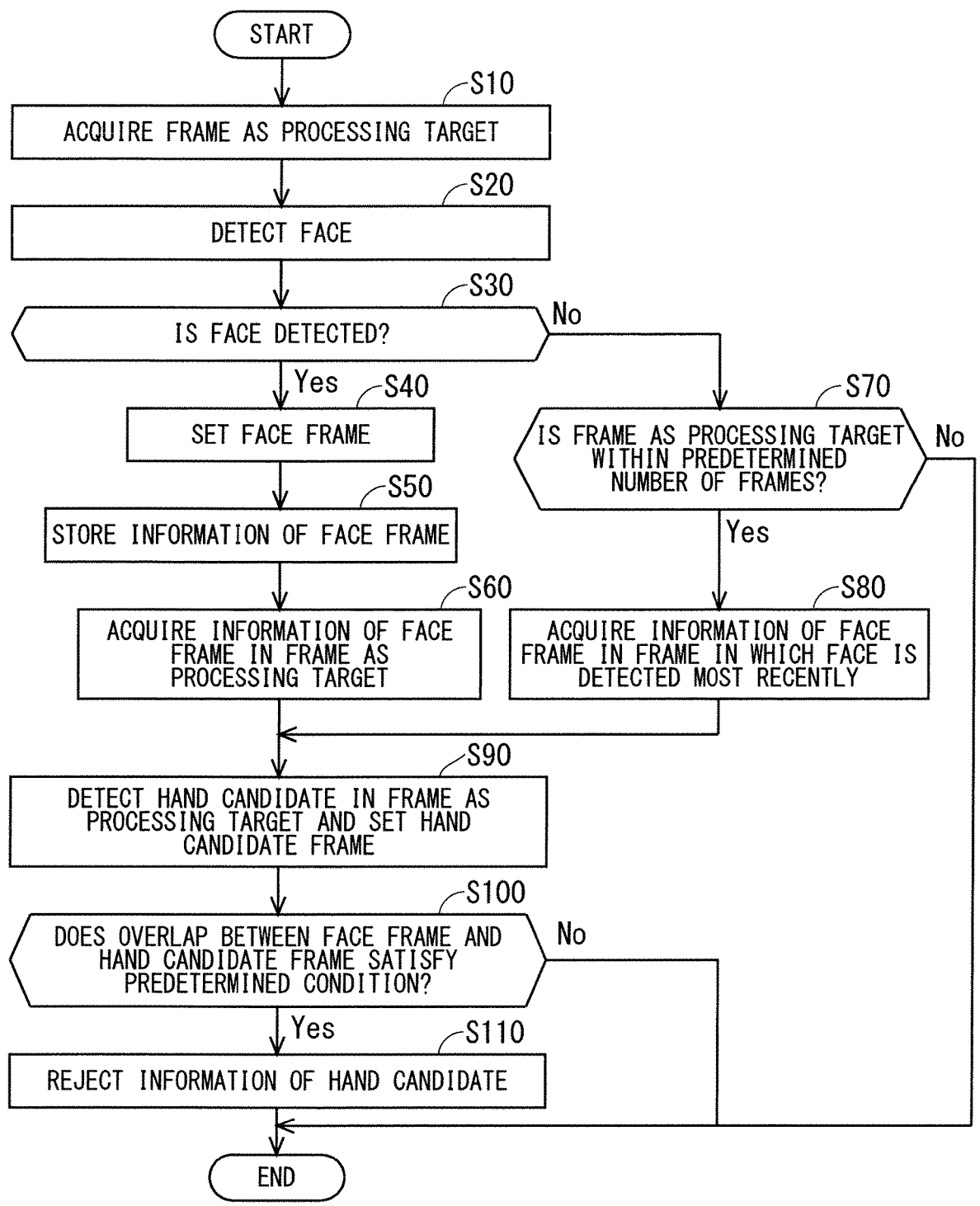
FIG. 6 is a flowchart illustrating a gesture detection method according to the second embodiment.

FIG. 6 is a flowchart illustrating a gesture detection method according to the second embodiment.

In step S10, the video acquisition unit 50 acquires a frame as a processing target in the video captured by the imaging device 110.

In step S20, the face detection unit 10 detects the face of the occupant in the frame as the processing target.

In step S30, the gesture detection apparatus 101 determines whether the face of the occupant is detected. In a case where the face of the occupant is detected, step S40 is executed. In a case where the face of the occupant is not detected, step S70 is executed.

In step S40, the face detection unit 10 sets a face frame for the detected face.

In step S50, the storage unit 60 stores the information of the face frame for each frame.

In step S60, the face frame information acquisition unit 20 acquires the information of the face frame in the frame as the processing target. The face frame information acquisition unit 20 may acquire the information of the face frame from the face detection unit 10 or from the storage unit 60. In addition, the face frame information acquisition unit 20 calculates the center of the face frame. The center of the face frame may be calculated by the face detection unit 10 and included in the information of the face frame.

In step S70, the face frame information acquisition unit 20 determines whether the frame as the processing target is a frame within a predetermined number of frames from the frame in which the face of the occupant is detected most recently. In a case where the frame as the processing target is a frame within a predetermined number of frames, that is, in a case where this condition is satisfied, step S80 is executed. If this condition is not satisfied, the gesture detection method ends.

In step S80, the face frame information acquisition unit 20 acquires the information of the face frame in the frame in which the face of the occupant is detected most recently from the storage unit 60. In addition, the face frame information acquisition unit 20 calculates the center of the face frame. The center of the face frame may be included in the information of the face frame stored in the storage unit 60.

In step S90, the hand candidate detection unit 30 detects a hand candidate of the occupant in the frame as the processing target. The hand candidate detection unit 30 sets a hand candidate frame for the hand candidate.

In step S100, the determination unit 40 determines whether the overlap between the face frame and the hand candidate frame satisfies a predetermined condition. In this case, the predetermined condition is that at least a part of the face frame overlaps the hand candidate frame, and the center of the face frame is included in the hand candidate frame. If this condition is satisfied, step S110 is executed. If this condition is not satisfied, the gesture detection method ends.

Figure 7:
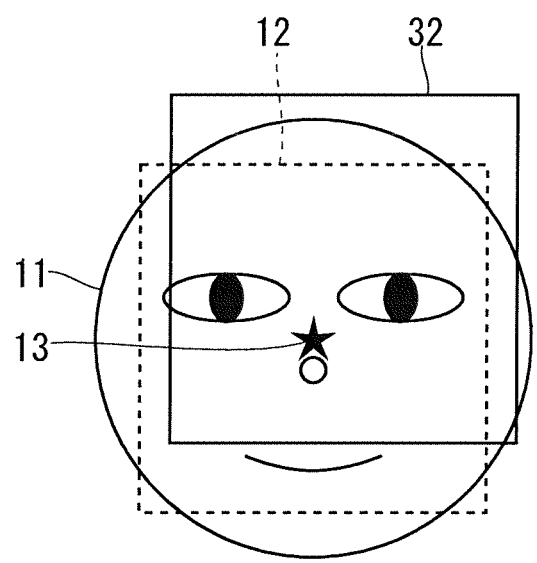
FIG. 7 is a view illustrating an example of a face frame and a hand candidate frame of an occupant.

FIG. 7 is a view illustrating an example of a face frame 12 and a hand candidate frame 32 of an occupant. Referring to FIG. 7, the occupant does not perform a hand gesture for operating the in-vehicle device 120. The face detection unit 10 accurately detects a face 11 of the occupant, and the face frame 12 is set on the basis of the detection result. The hand candidate detection unit 30 erroneously detects the face 11 of the occupant as a hand candidate, and the hand candidate frame 32 is set on the basis of the detection result. As illustrated in FIG. 7, in a case where the head of the occupant is shaved, the hand candidate detection unit 30 may determine that the face 11 of the occupant is a hand (such as a thumbs-up hand) in a state where at least some of the fingers are closed and detect the face as a hand candidate. However, referring to FIG. 7, a part of face frame 12 overlaps the hand candidate frame 32, and the center 13 of face frame 12 is included in the hand candidate frame 32. Therefore, step S110 is executed.

Figure 8:
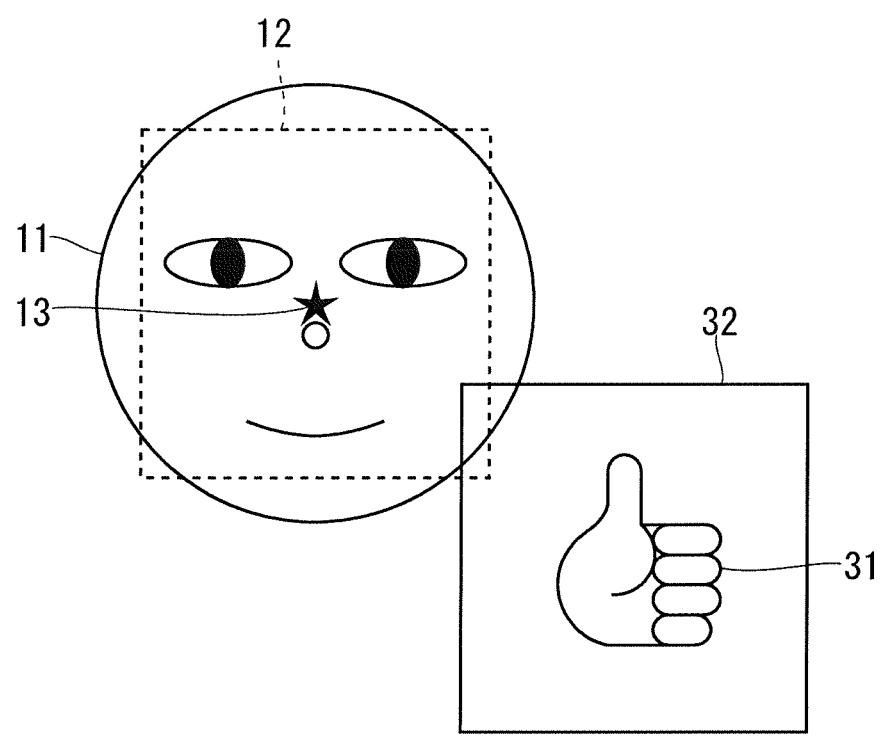
FIG. 8 is a view illustrating another example of a face frame and a hand candidate frame of an occupant.

FIG. 8 is a view illustrating another example of a face frame 12 and a hand candidate frame 32 of an occupant. Referring to FIG. 8, the occupant performs a gesture of hand 31 for operating in-vehicle device 120 beside the face 11. The face detection unit 10 accurately detects a face 11 of the occupant, and the face frame 12 is set on the basis of the detection result. The hand candidate detection unit 30 has accurately detected the hand 31 of the occupant as a hand candidate, and the hand candidate frame 32 is set on the basis of the detection result. Although a part of face frame 12 overlaps the hand candidate frame 32, the center 13 of the face frame 12 is not included in the hand candidate frame 32. Therefore, the determination unit 40 ends the gesture detection method without rejecting the information of the hand candidate.

FIG. 9 is a view illustrating an example in which the hand candidate frame 32 in FIG. 8 is enlarged. The hand candidate detection unit 30 accurately detects the hand 31 of the occupant as a hand candidate. In this case, the hand candidate frame 32 magnified twice vertically and horizontally with respect to a center 33 of the hand 31 is set. A part of face frame 12 overlaps the hand candidate frame 32, and the center 13 of face frame 12 is included in the hand candidate frame 32. Therefore, step S110 is executed.

In step S110, the determination unit 40 rejects the information of the hand candidate. For example, the determination unit 40 identifies the hand candidate as an object other than the hand. For example, the determination unit 40 replaces the detection result of the hand candidate with the detection result of an object other than the hand. In this manner, the determination unit 40 rejects the information of the hand candidate on the basis of a predetermined condition regarding the overlap between the face frame 12 and the hand candidate frame 32. This completes the gesture detection method.

In the gesture detection method described above, the gesture detection apparatus 101 performs the processing of detecting the face 11 and the processing of acquiring the information of the face frame 12, and then performs the processing of detecting a hand candidate and the processing of setting the hand candidate frame 32. However, the gesture detection apparatus 101 may execute processing of detecting the face 11 and processing of acquiring the information of the face frame 12 after the processing of detecting a hand candidate and processing of setting the hand candidate frame 32. Alternatively, the gesture detection apparatus 101 may execute the processing of detecting a hand candidate and the processing of setting the hand candidate frame 32 in parallel with the processing of detecting the face 11 and the processing of acquiring the information of the face frame 12.

Next, as an example, a gesture detection method in the second frame in a case where the first frame and the second frame constituting the video have the above relationship will be described. In this case, the face detection unit 10 has succeeded in detecting the face 11 of the occupant in the first frame, and has failed in detecting the face 11 of the occupant in the second frame after the first frame. The first frame is a frame in which the face 11 of the occupant is detected immediately before the second frame.

In step S10, the video acquisition unit 50 acquires the second frame of the video captured by the imaging device 110.

In step S20, the face detection unit 10 fails to detect the face 11 of the occupant in the second frame.

In step S30, the gesture detection apparatus 101 determines that the face 11 of the occupant is not detected. Step S70 is executed.

In step S70, the face frame information acquisition unit 20 determines whether the second frame is a frame within a predetermined number of frames from the first frame in which the face 11 of the occupant is detected most recently. As described above, since the first frame and the second frame satisfy this condition, step S80 is executed.

In step S80, the face frame information acquisition unit 20 acquires the information of the face frame 12 in the first frame from the storage unit 60.

In step S90, the hand candidate detection unit 30 detects a hand candidate of the occupant in the second frame. The hand candidate detection unit 30 sets the hand candidate frame 32 for the hand candidate.

In step S100, the determination unit 40 determines whether or not at least a part of the face frame 12 of the second frame overlaps the hand candidate frame 32 of the first frame, and the center 13 of the face frame 12 of the second frame is included in the hand candidate frame 32 of the first frame. If this condition is satisfied, step S110 is executed. If this condition is not satisfied, the gesture detection method ends.

In step S110, the determination unit 40 rejects the information of the hand candidate in the second frame. This completes the gesture detection method.

As described above, the predetermined condition in the second embodiment is that at least a part of the face frame 12 overlaps the hand candidate frame 32, and the center 13 of the face frame 12 is included in the hand candidate frame 32.

The gesture detection apparatus 101 described above reduces the occasion of identifying an object other than the hand of the occupant as the hand 31. That is, the gesture detection apparatus 101 accurately detects the hand 31 constituting the gesture of the occupant. For example, in a case where the head of the occupant is shaved, the hand candidate detection unit 30 may determine that the head (or the face 11) of the occupant is the hand 31 in a state where at least some of the fingers are closed and detect the face as a hand candidate (see, for example, FIG. 7). Alternatively, for example, in a case where the hairstyle of the occupant is spiky, the hand candidate detection unit 30 may detect the head as a hand candidate with the face 11 of the occupant as the palm and the hairstyle as fingers. In such a case, the face frame 12 and the hand candidate frame 32 overlap each other at a close distance. In a case where at least a part of the face frame 12 overlaps the hand candidate frame 32 and the center 13 of the face frame 12 is included in the hand candidate frame 32, the determination unit 40 of the gesture detection apparatus 101 according to the second embodiment rejects the information of the hand candidate. Therefore, the gesture detection apparatus 101 accurately detects the hand 31 of the occupant regardless of the shape, hairstyle, and the like of the face 11 of the occupant.

The predetermined condition regarding the overlap between face frame 12 and hand candidate frame 32 is not limited to the above condition. The condition may be, for example, that the area of the overlapping region between face frame 12 and hand candidate frame 32 is equal to or larger than a predetermined threshold. Alternatively, for example, the condition may be that the ratio of the area of the overlapping region to the area of the face frame 12 or the hand candidate frame 32 is equal to or larger than a predetermined threshold. Alternatively, for example, the condition may be that hand candidate frame 32 overlaps a predetermined region in the face frame 12. The predetermined region is, for example, a region opposite to the direction in which the imaging device 110 is provided.

The gesture detection apparatus 101 according to the second embodiment includes the storage unit 60. The storage unit 60 stores the information of the face frame 12 set for each frame with respect to the face 11 detected for each frame of the video. When the face 11 of the occupant in the first frame of the video is detected and the face 11 of the occupant in the second frame after the first frame is not detected, the face frame information acquisition unit 20 acquires the information of the face frame 12 in the first frame from the storage unit 60. The second frame is a frame within a predetermined number of frames from the first frame. The hand candidate detection unit 30 detects a hand candidate in the second frame. The determination unit 40 rejects the information of the hand candidate in the second frame on the basis of a condition regarding the overlap between the face frame 12 in the first frame and the hand candidate frame 32 in the second frame as a predetermined condition.

Since the pattern matching processing for face detection and the pattern matching processing for hand candidate detection are different from each other, even when the face detection unit 10 fails to detect the face 11 of the occupant, the hand candidate detection unit 30 may erroneously detect the face 11, the head, and the like of the occupant as the hand candidates. Even in such a case, the gesture detection apparatus 101 according to the second embodiment determines the overlap between the face frame 12 in the frame in which the face 11 is detected before the frame as the processing target and the hand candidate frame 32 in the frame as the processing target. Therefore, the gesture detection apparatus 101 prevents the face 11 or the head of the occupant from being detected as the hand 31 even in a state where the face 11 of the occupant is temporarily not detected. As a result, the detection accuracy of the hand 31 of the occupant is improved.

The first frame according to the second embodiment is a frame in which the face 11 of the occupant is detected immediately before the second frame.

Even in a state where the face 11 of the occupant is not detected temporarily, the gesture detection apparatus 101 determines the overlap between the most recently detected face frame 12 and the hand candidate frame 32 in the frame as the processing target. Therefore, the gesture detection apparatus 101 accurately detects the hand 31 of the occupant.

Third Embodiment

A gesture detection apparatus and a gesture detection method according to a third embodiment will be described. The third embodiment is a subordinate concept of the first embodiment, and the gesture detection apparatus according to the third embodiment includes each component of the gesture detection apparatus 101 in the second embodiment. Note that a description of configurations and operations similar to those of the first or second embodiment will be omitted.

A face detection unit 10 detects a face 11 of the occupant for each frame of a video. At this time, the face detection unit 10 detects a face part of the occupant. The face detection unit 10 can detect the face 11 of the occupant without necessarily detecting all face parts. For example, the face detection unit 10 detects the face 11 of the occupant by detecting at least two eyes. In that case, detection of the nose and mouth is not necessarily required.

A face frame information acquisition unit 20 acquires the information of the face parts of the occupant detected by the face detection unit 10.

In a case where the following two conditions are satisfied, a determination unit 40 rejects the information of a hand candidate. One condition is a case where a predetermined condition regarding the overlap between face frame 12 and hand candidate frame 32 is satisfied. The predetermined condition in the third embodiment is that at least a part of the face frame 12 overlaps the hand candidate frame 32, and a center 13 of the face frame 12 is included in the hand candidate frame 32. Another condition is that the face parts detected by the face detection unit 10 include all the predetermined face parts. The information of the predetermined face parts may be stored in the gesture detection apparatus or may be input from the outside, for example.

An example in which the predetermined face parts are two eyes, a nose, and a mouth will be described below.

Figure 10:
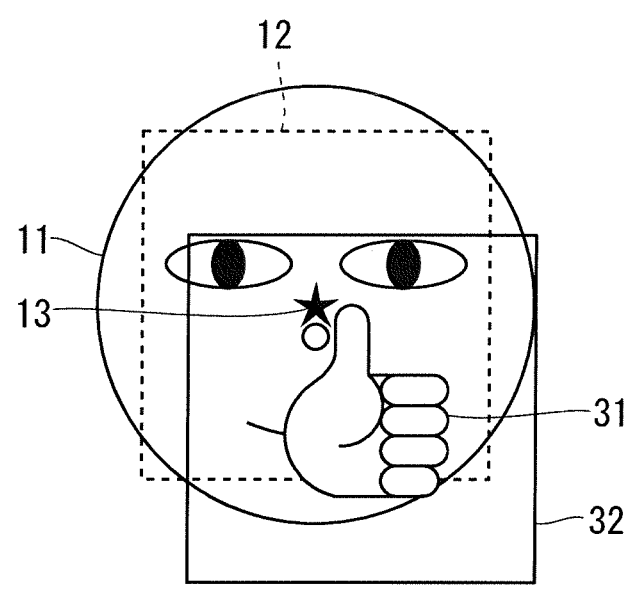
FIG. 10 is a view illustrating an example of a face frame and a hand candidate frame of an occupant in a frame as a processing target.

FIG. 10 is a view illustrating an example of the face frame 12 and the hand candidate frame 32 of an occupant in a frame as a processing target. Referring to FIG. 10, the occupant performs the gesture of the hand 31 for operating in-vehicle device 120 near the face 11. When detecting the face 11 of the occupant, the face detection unit 10 detects the two eyes and the nose as face parts. Since most of the mouth is hidden behind the hand 31, the face detection unit 10 does not detect the mouth as a face part. The hand candidate detection unit 30 detects the hand 31 near the face 11 of the occupant as a hand candidate. A part of face frame 12 overlaps the hand candidate frame 32, and the center 13 of face frame 12 is included in the hand candidate frame 32. The face parts detected by the face detection unit 10 include only two eyes and a nose, and do not include all of the two eyes, the nose, and the mouth as predetermined face parts. In other words, the face parts detected by the face detection unit 10 include only parts of the predetermined face parts. Therefore, the determination unit 40 does not reject the information of the hand candidate.

Figure 11:
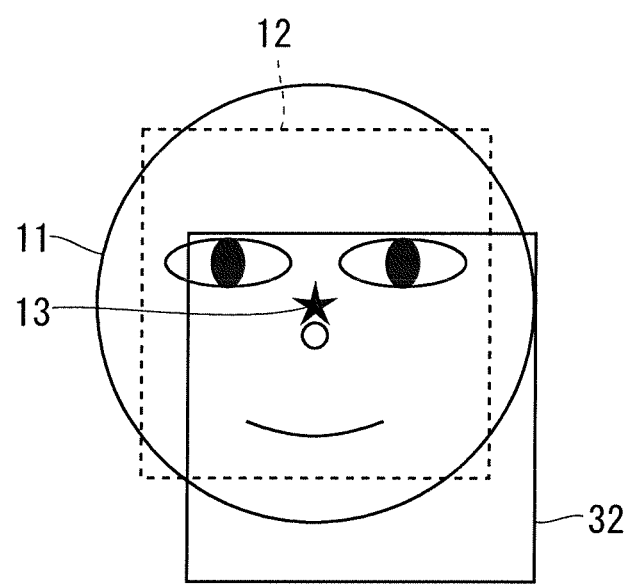
FIG. 11 is a view illustrating an example of a face frame and a hand candidate frame of an occupant in a frame as a processing target.

FIG. 11 is a view illustrating an example of the face frame 12 and the hand candidate frame 32 of an occupant in a frame as another processing target. Referring to FIG. 11, the occupant does not make the gesture of the hand 31. When detecting the face 11 of the occupant, the face detection unit 10 detects the two eyes, the nose, and the mouth as face parts. The hand candidate detection unit 30 has erroneously detected the face 11 of the occupant as a hand candidate. A part of face frame 12 overlaps the hand candidate frame 32, and the center 13 of face frame 12 is included in the hand candidate frame 32. The face parts detected by the face detection unit 10 are two eyes, a nose, and a mouth, and include all of the two eyes, the nose, and the mouth as the predetermined face parts. Therefore, the determination unit 40 rejects the information of the hand candidate.

The functions of the face detection unit 10, the face frame information acquisition unit 20, and the determination unit 40 are implemented by the processing circuit illustrated in FIG. 2 or 3.

Figure 12:
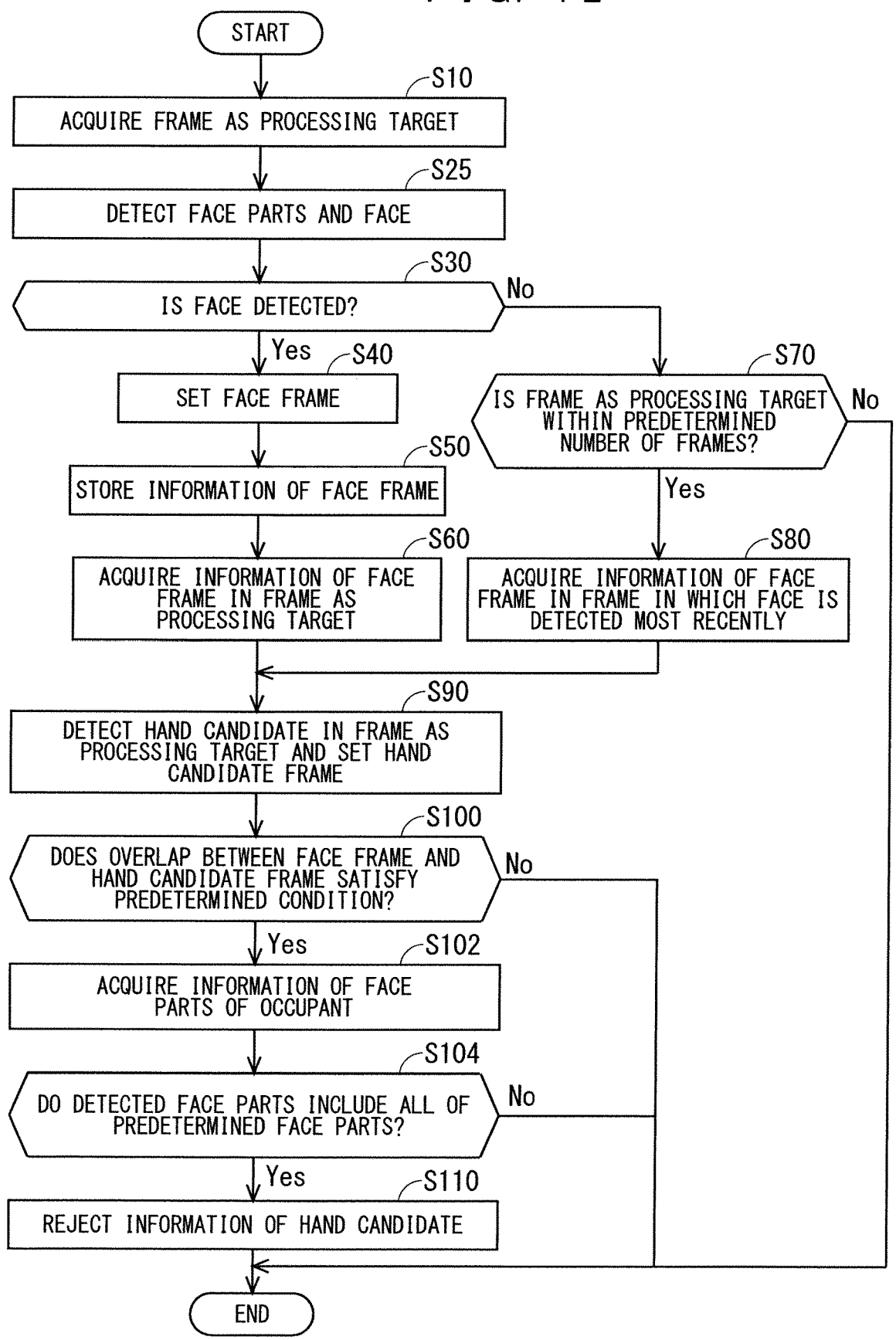
FIG. 12 is a flowchart illustrating a gesture detection method according to a third embodiment.

FIG. 12 is a flowchart illustrating a gesture detection method according to the third embodiment. In the flowchart illustrated in FIG. 6, step S20 is replaced with step S25, and steps S102 and S104 are added.

Step S10 is the same as step S10 illustrated in FIG. 6.

In step S25, the face detection unit 10 detects the face part and the face 11 of the occupant.

Steps S30 to S100 are similar to steps S30 to S100 illustrated in FIG. 6. In a case where a part of the face frame 12 overlaps the hand candidate frame 32 and the center 13 of the face frame 12 is included in the hand candidate frame 32 in step S100, step S102 is executed.

In step S102, the face frame information acquisition unit 20 acquires the information of the face parts of the occupant detected by the face detection unit 10.

In step S104, the determination unit 40 determines whether the face part detected by the face detection unit 10 includes all the predetermined face parts. In a case where the detected face parts include all of the predetermined face parts, step S110 is executed. In a case where the detected face parts do not include all the predetermined face parts, the determination unit 40 does not reject the information of the hand candidate, and the gesture detection method ends. In other words, when the detected face parts include only parts of the predetermined face parts, the gesture detection method ends.

To summarize the above description, the face frame information acquisition unit 20 according to the third embodiment acquires the information of the face parts of the occupant detected based on the video. In a case where a predetermined condition regarding the overlap between the face frame 12 and the hand candidate frame 32 is satisfied and the face parts detected based on the video include all of the predetermined face parts, the determination unit 40 rejects the information of the hand candidate.

Such a gesture detection apparatus determines whether or not to accurately reject the information of the hand candidate even when the occupant performs the gesture of the hand 31 for the operation of the in-vehicle device 120 near the face 11.

Fourth Embodiment

The gesture detection apparatus described in each of the above embodiments can also be applied to a system constructed by appropriately combining a navigation device, a communication terminal, a server, and functions of applications installed in these devices. In this case, the navigation device includes, for example, a portable navigation device (PND). The communication terminal includes, for example, a mobile terminal such as a cellular phone, a smartphone, and a tablet.

Figure 13:
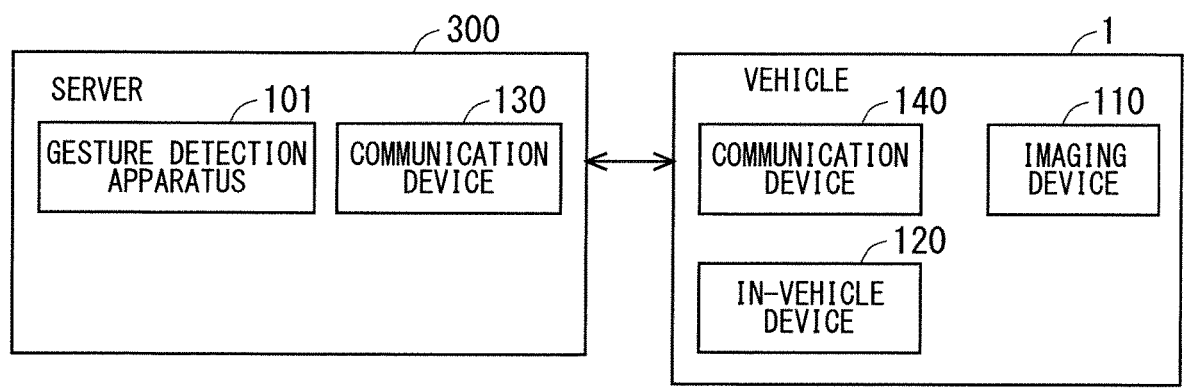
FIG. 13 is a block diagram illustrating the configuration of a gesture detection apparatus and a device that operates in association with the gesture detection apparatus according to a fourth embodiment.

FIG. 13 is a block diagram illustrating the configuration of a gesture detection apparatus 101 and a device that operates in association with the gesture detection apparatus 101 according to a fourth embodiment.

The gesture detection apparatus 101 and a communication device 130 are provided in a server 300. The gesture detection apparatus 101 acquires a video captured by an imaging device 110 provided in a vehicle 1 via a communication device 140 and the communication device 130. The gesture detection apparatus 101 acquires the information of a face frame 12 of the occupant detected on the basis of the video. The gesture detection apparatus 101 detects a hand candidate on the basis of the video and sets a hand candidate frame 32. The gesture detection apparatus 101 rejects the information of the hand candidate on the basis of a predetermined condition regarding the overlap between a face frame 12 of the occupant and the hand candidate frame 32. The gesture detection apparatus 101 identifies the hand candidate not rejected as the hand 31 constituting the gesture of the occupant. Operation processing and the like of the in-vehicle device 120 are executed on the basis of the gesture by the hand 31 of the occupant identified by the gesture detection apparatus 101.

As described above, since the gesture detection apparatus 101 is placed in the server 300, the configuration of the device provided in the vehicle 1 is simplified.

In addition, the functions or components of the gesture detection apparatus 101 may be arranged in a distributed manner such that some of the functions or components are provided in the server 300 and other parts are provided in the vehicle 1. A similar effect is obtained also in a case where the gesture detection apparatus 100 described in the first embodiment is provided in the server 300.

Note that in the present disclosure, the respective embodiments can be freely combined and can be modified and omitted as needed.

While the present disclosure has been described in detail, the above description is in all aspects exemplary and is not exhaustive. Numerous modifications not illustrated are conceivable.

EXPLANATION OF REFERENCE SIGNS

1: vehicle
10: face detection unit
11: face
12: face frame
13: center
20: face frame information acquisition unit
30: hand candidate detection unit
31: hand
32: hand candidate frame
33: center
40: determination unit
50: video acquisition unit
60: storage unit
100: gesture detection apparatus
101: gesture detection apparatus
110: imaging device
120: in-vehicle device

The invention claimed is:

1. A gesture detection apparatus comprising:
a processor to execute a program, and
a memory to store the program which, when executed by the processor, performs processes of,
acquiring information of a face frame set to surround a face of an occupant detected based on a video captured by an imaging device provided in a vehicle;
detecting a hand candidate that is a candidate for a hand of the occupant based on the video; and
rejecting information of the hand candidate so that the hand candidate is not detected as the hand of the occupant in a gesture of the occupant as a detection target, based on a predetermined condition regarding an overlap between the face frame in the video and a hand candidate frame set to surround the hand candidate.

2. The gesture detection apparatus according to claim 1, further comprising a storage that stores the information of the face frame set for each frame with respect to the face detected for each frame of the video,
wherein
when the face of the occupant in a first frame of the video is detected and the face of the occupant in a second frame that is within a predetermined number of frames from the first frame and is after the first frame is not detected,
the information of the face frame in the first frame is acquired from the storage,
the hand candidate in the second frame is detected, and
the information of the hand candidate in the second frame is rejected based on a condition regarding the overlap between the face frame in the first frame and the hand candidate frame in the second frame as the predetermined condition.

3. The gesture detection apparatus according to claim 2, wherein the first frame is a frame in which the face of the occupant is detected immediately before the second frame.

4. The gesture detection apparatus according to claim 1, wherein
information of face parts of the occupant detected based on the video is further acquired, and
the information of the hand candidate is rejected when the predetermined condition regarding the overlap between the face frame and the hand candidate frame is satisfied and the face parts detected based on the video includes all of predetermined face parts.

5. The gesture detection apparatus according to claim 1, wherein the predetermined condition is that at least a part of the face frame overlaps the hand candidate frame, and a center of the face frame is included in the hand candidate frame.

6. A gesture detection method comprising:
acquiring information of a face frame set to surround a face of an occupant detected based on a video captured by an imaging device provided in a vehicle;
detecting a hand candidate that is a candidate for a hand of the occupant based on the video; and
rejecting information of the hand candidate so that the hand candidate is not detected as the hand of the occupant in a gesture of the occupant as a detection target, based on a predetermined condition regarding an overlap between the face frame in the video and a hand candidate frame set to surround the hand candidate.

7. The gesture detection apparatus according to claim 1, wherein the hand candidate is detected using a pattern matching process matching a pattern of the shape of an object in the video with a predetermined hand shape pattern.

8. The gesture detection apparatus according to claim 1, wherein the size of the hand candidate frame is set based on the size of the face frame.

9. The gesture detection apparatus according to claim 1, wherein the size of the hand candidate frame is set to a size to which the face frame is enlarged or reduced at a magnification with reference to a center position of the hand candidate frame.

10. The gesture detection apparatus according to claim 1, wherein the predetermined condition includes the overlap between the face frame in the video and a hand candidate frame set to surround the hand candidate, and a center of the face frame being included in the hand candidate frame.

* * * * *